No. 877,877. PATENTED JAN. 28, 1908.
W. C. ALTHEN.
WIRE RETRIEVING ATTACHMENT FOR TROLLEY WHEELS.
APPLICATION FILED MAR. 22, 1907.
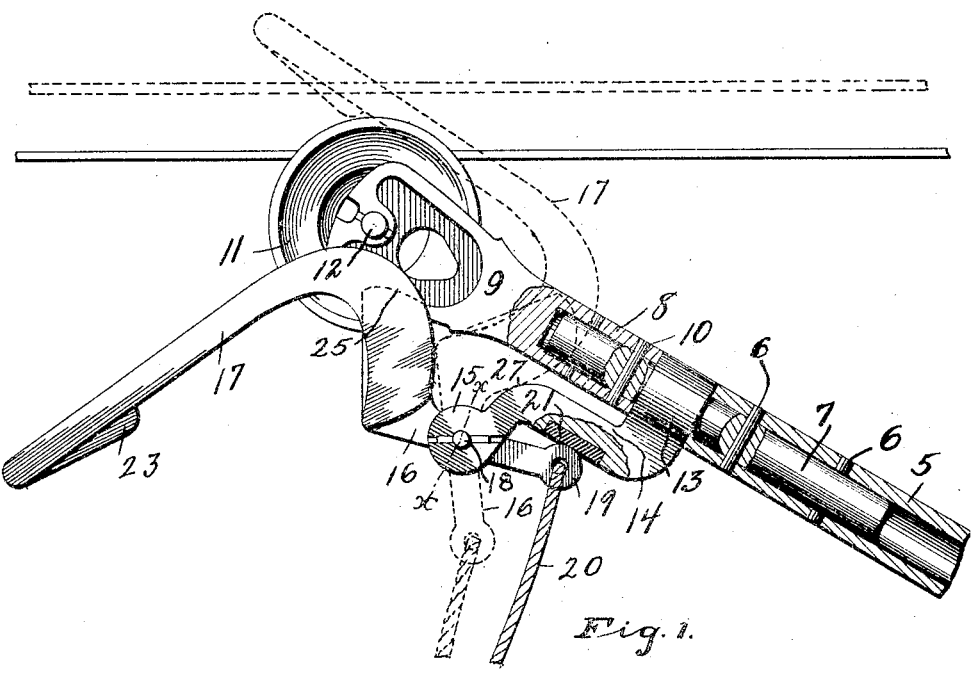
Fig. 1.
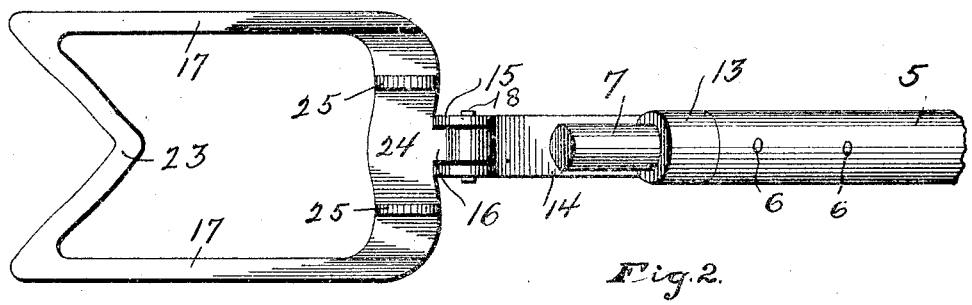
Fig. 2.
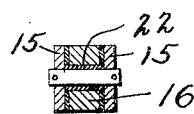
Fig. 4.
Fig. 3.
Witnesses
Carl Stoughton
F. G. Campbell
Inventor
William C. Althen
By Chester C. Shephard
Attorney

UNITED STATES PATENT OFFICE.

WILLIAM C. ALTHEN, OF COLUMBUS, OHIO, ASSIGNOR OF ONE-SIXTH TO WILLIAM F. MIESSE, ONE-SIXTH TO WILLIAM N. GEARHART, ONE-SIXTH TO BENJAMIN F. HIRT, AND ONE-FOURTH TO JOHN T. DUNNICK, OF COLUMBUS, OHIO.

WIRE-RETRIEVING ATTACHMENT FOR TROLLEY-WHEELS.

No. 877,877.         Specification of Letters Patent.         Patented Jan. 28, 1908.

Application filed March 22, 1907. Serial No. 363,909.

*To all whom it may concern:*

Be it known that I, WILLIAM C. ALTHEN, citizen of the United States, residing at Columbus, in the county of Franklin and State of Ohio, have invented certain new and useful Improvements in Wire-Retrieving Attachments for Trolley-Wheels, of which the following is a specification.

My invention relates to wire retrieving attachments for trolley wheels and has for its object the provision of a device which normally lies below the trolley harp, but which is automatically thrown above the trolley harp and trolley wheel when a pull is applied to the trolley rope, said retriever comprising a wire guiding portion which is adapted to guide the trolley wheel back upon the wire and said retriever being constructed in such manner as to catch and engage the wire when the trolley wheel slips therefrom to prevent the trolley pole from springing to an upright position under the influence of the powerful springs that normally hold the trolley wheel in engagement with the wire.

It is a well known fact that when a trolley wheel leaves the trolley wire, and the trolley pole springs to an upright position, this movement of the trolley pole added to the bodily movement of the trolley pole as it is carried along by the car, causes great damage to the guy wires which support the trolley wire.

A further object of the invention is the provision of means for insulating the wire retriever from the trolley pole as long as such retriever lies in its lower position, but said retriever being arranged to be brought into electrical communication with the trolley pole when said retriever is in its upright position, to serve a purpose which will be hereinafter set forth.

Further objects and advantages of the invention will be set forth in the detailed description which now follows.

In the accompanying drawing: Figure 1 is a side elevation of a trolley pole and harp having my invention applied thereto, the normal position of the device being illustrated in full lines and its operative position being illustrated in dotted lines, Fig. 2 is a plan view of the attachments comprising the present invention and a portion of the trolley pole, Fig. 3 is a view of the trolley retrieving yoke hereinafter described looking toward the left in Fig. 1, and, Fig. 4 is a detail sectional view upon line *x—x* of Fig. 1.

Like numerals designate corresponding parts in all of the figures of the drawing.

Referring to the drawing, the numeral 5 designates a tubular trolley pole. Secured in this trolley pole by a pin 6 is a short bar 7, the upper end of which receives the tubular end 8 of a trolley harp 9. Pins 10 secure the trolley harp in position upon the bar. A trolley wheel 11 is journaled as at 12 in the trolley harp. The parts just described are of the usual and well known construction and need no further description.

The device herein shown and described is an improvement upon the like structure shown in Letters Patent of the United States No. 846,378, issued to me on the 5th day of March, 1907. Secured upon the bar 7 between the tubular trolley pole 5 and the tubular end 8 of the trolley harp in such manner as to form a flush joint at the front face of the pole, is a bracket 13 having a rearwardly inclined arm 14 which terminates in a bifurcated member 15. The shank 16 of a yoke 17 is pivoted in the bifurcated member 15 as at 18. The end of this shank is provided with an eyelet 19 adapted to receive the end of the trolley rope 20. A block of insulating material 21 is set into the arm 14 of the bracket 13 in such position that the eyelet 19 rests there-against when the parts are in the position illustrated in full lines in Fig. 1. The shank 16 of the yoke 17 is insulated at its pivot point by an insulating bushing 22 (see Fig. 4). The side members of the yoke 17 are connected by a V-shaped cross member 23, the V-shaped recess formed thereby being adapted to receive the trolley wire as will be hereinafter described. The side members 17 are connected at their inner ends by a cross bar 24 from which the shank 16 extends. Webs 25 carried by the cross bar 24, lie close upon each side of the trolley harp 9 and serve to catch the trolley wire between themselves and the sides of the yoke 17 (see Fig. 3) when the trolley wheel slips from the wire. These webs prevent the trolley wire from coming down beneath the trolley wheel or beneath the trolley harp. It has been found that when the wire gets hooked beneath the trolley harp or the trolley wheel, in a device of this character, current is supplied to the car and oftentimes, particularly at night, the conductor has supposed that the trolley had been replaced upon the wire and had signaled the motorman to go ahead, when in fact the wire was hung beneath the trolley wheel and between the trolley wheel and the wire retrieving device. It is to prevent this that the improvements herein set forth are particularly designed. As long as the wire retrieving attachment is in its lower position and the wire lies between the webs 25 and the sides of the yoke, no current can be supplied to the car for the yoke is insulated both at its pivotal point and by the block 21, from the rest of the structure.

When the wire retrieving attachment lies in the position illustrated in dotted lines in Fig. 1, it will conduct current to the car, for at that time the cross bar 24 lies against the shoulder 27 of the arm 14. The car may then be started and just as soon as the car is started, for the forward movement of the car causes the yoke to ride back to the full line position and permits the trolley wheel to move up into engagement with the trolley wire. It will therefore be seen that the yoke is insulated from the trolley pole as long as it lies in its lowermost position, but is in electrical contact with said pole when it is in its uppermost position and engaging the trolley wire. Current will therefore be only transmitted to the car when the yoke lies in such position that the resulting movement of the car will replace the wheel upon the wire.

From the foregoing description, it will be seen that simple and efficient means are herein provided for accomplishing the objects of the invention, but while the elements shown and described are well adapted to serve the purpose for which they are intended, it is to be understood that the invention is not limited to the precise construction set forth, but includes within its purview such changes as may be made within the scope of the appended claims.

What I claim is:

1. The combination with a trolley pole and wheel, of a wire retrieving yoke pivotally mounted in the rear of the trolley pole, said yoke normally lying below the trolley wire and being adapted to be thrown above said trolley wheel when a pull is given the trolley rope, means for insulating the yoke from the trolley pole when the yoke is in its lowermost position, and means for completing an electrical connection to the trolley pole when said yoke is in its uppermost position.

2. The combination with a trolley pole and wheel, of a wire retrieving yoke pivotally mounted in rear of the trolley pole, said yoke normally lying below the trolley wire and being adapted to be thrown above said trolley wheel when a pull is given the trolley rope, and ribs carried by the yoke which lie close to the trolley harp and which are adapted to receive the trolley wire between themselves and the sides of the yoke.

3. The combination with a trolley pole and wheel, of a bracket secured to said trolley pole and lying in the rear thereof, a yoke pivoted to the bracket, means for insulating said yoke from the bracket at its pivotal point, said yoke having a V-shaped wire guiding portion and an arm which extends beyond its pivotal point and is adapted to have a trolley rope secured thereto, and ribs carried by the yoke which lie close to the sides of the trolley harp and are adapted to receive the trolley wire between themselves and the side of the yoke, and means for insulating the free end of the arm that has the trolley rope secured thereto from the bracket.

In testimony whereof I affix my signature in presence of two witnesses.

WILLIAM C. ALTHEN.

Witnesses:
L. CARL STOUGHTON,
A. L. PHELPS.